United States Patent [19]

Iff

[11] Patent Number: 4,759,530
[45] Date of Patent: Jul. 26, 1988

[54] STEM AND DISC SEAL CONSTRUCTION FOR BUTTERFLY VALVES

[75] Inventor: Rene Iff, Bern, Switzerland

[73] Assignee: Neotecha AG, Hombrechtikon, Switzerland

[21] Appl. No.: 68,757

[22] Filed: Jun. 26, 1987

Related U.S. Application Data

[63] Continuation of Ser. No. 921,853, Oct. 20, 1986, abandoned, which is a continuation of Ser. No. 671,174, Nov. 14, 1984, abandoned.

[51] Int. Cl.$^4$ .................................. F16K 1/228
[52] U.S. Cl. ...................................... 251/306; 251/214
[58] Field of Search ............... 251/306, 308, 214, 305, 251/307; 137/375

[56] References Cited

U.S. PATENT DOCUMENTS

| | | | |
|---|---|---|---|
| 3,096,071 | 7/1963 | Fisher | 251/308 X |
| 3,778,028 | 12/1973 | Graves et al. | 251/306 |
| 3,991,974 | 11/1976 | Bonafous | 251/306 |
| 4,266,754 | 5/1981 | Ninomiya et al. | 251/306 |
| 4,358,086 | 11/1982 | Hiltebrand | 251/306 |

FOREIGN PATENT DOCUMENTS 1239533  4/1967  Fed. Rep. of Germany ...... 251/305

Primary Examiner—A. Michael Chambers
Assistant Examiner—John C. Fox
Attorney, Agent, or Firm—Hubbard, Thurman, Turner & Tucker

[57] ABSTRACT

A butterfly type valve has a closure disc with opposed trunnions or support stem portions for rotatably supporting the closure disc in a valve body which is bored to receive respective sets of circular disc type springs urging seal faces on a body liner into engagement with cooperating annular seal faces formed on an overmold resilient plastic layer on the closure disc. The closure disc outer layer is formed of PFA or PVDF type plastic and the body liner of PTFE type plastic, respectively to eliminate cold fusion when the closure disc is forcibly engaged with a seat surface formed by the liner. The closure disc layer includes a portion filling an undercut groove in the closure disc stems which is cooperable with a cylindrical collar formed on the liner and a backup seal to further seal the stem portions from exposure to the fluid flowing through the valve or the environment in which the valve is disposed.

4 Claims, 2 Drawing Sheets

STEM AND DISC SEAL CONSTRUCTION FOR BUTTERFLY VALVES

This application is a continuation of application Ser. No. 921,853, filed Oct. 20, 1986, now abandoned, which is a continuation of application Ser. No. 671,174, filed Nov. 14, 1984, now abandoned.

BACKGROUND OF THE INVENTION

Field of the Invention

The present invention pertains to closure member stem seals and resilient closure member and seat surface seals for valves, particularly butterfly type valves.

BACKGROUND

In the art of valves which have closure member actuator stems which must be sealed with respect to the fluid flowing through the valve there have been several longstanding problems in providing seals which do not collect or trap fluid or particulates entrained in the fluid flowing through the valves, and also in providing seal structures which may be easily assembled and disassembled for servicing and repair. This problem is particularly acute with butterfly type valves and similar types of valves which have closure members which are rotatable about the axis of an actuator stem.

In an effort to develop valves which are suitable for use with corrosive fluids or which must meet sanitary application requirements various types of plastic valve components have been utilized including plastic seat liners and valve closure members which are coated with plastic to protect the closure member core structure and to also provide for a better seal between the closure member and the seat surface. However, one problem with resilient plastic type seals or liners pertains to a tendency for fusion to occur between the materials used for the closure member and the seat surface when these two structures are in forcible engagement with each other.

The present invention overcomes certain problems in the art of valves, in particular butterfly type valves, inclusive of the problems indicated above.

SUMMARY OF THE INVENTION

The present invention pertains to an improved actuator stem seal construction for a fluid handling valve wherein a combination of seal elements and seal element biasing springs are arranged to prevent leakage of fluid from the interior of the valve to the exterior as well as to prevent exposure of certain components in the seal structure to atmospheric contaminates.

In accordance with one aspect of the present invention there is provided an improved closure disc seal structure for a butterfly type valve wherein a plurality of seal rings are acted on by disc type springs with high force deflection characteristics and are advantageously disposed in the valve housing or body in a relatively small space. The disc or Belleville type springs also facilitate assembly and disassembly of the valve closure disc with respect to the valve body in that the seal components and the seal pusher may be more easily inserted than with seals utilizing coil or other types of high deflection springs.

In accordance with another aspect of the present invention there is provided a butterfly type valve having a closure disc which is coated or overmolded with a PFA or PVDF plastic coating or liner and a PTFE innerlining of the valve body. The PFA or PVDF plastics and the PTFE plastic are particularly compatible for use on cooperating parts which are forcibly engaged with each other without a tendency for fusion to occur between the engaged surfaces of the respective parts. Accordingly, there is little tendency for degradation to occur between the closure disc and the valve seat or between the seal between the closure disc liner and the body liner where these two components form a seal point around the opposed closure disc stem portions.

In accordance with another aspect of the present invention closure disc stem or shaft seals are provided by a valve seat or valve body liner of a resilient material and adapted to seal directly against a closure disc which is also provided with a coating or overmolded liner. The seal point between the closure disc and the body liner is provided with means to make the seal self adjusting and to virtually eliminate any space for the collection of material flowing through the valve.

The abovementioned features and advantages of the present invention as well as other superior aspects thereof will be further appreciated by those skilled in the art upon reading the detailed description which follows in conjunction with the drawing.

DESCRIPTION OF THE PREFERRED EMBODIMENTS

Figure 1:
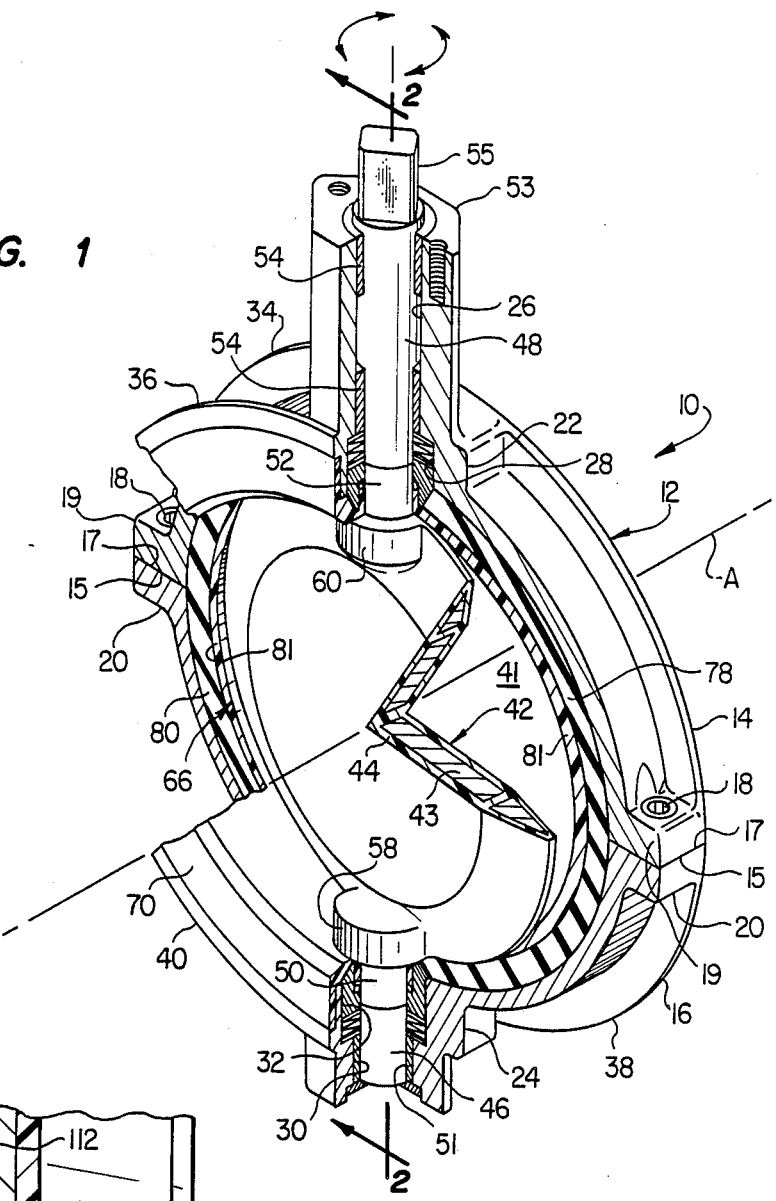
FIG. 1 is a perspective view, partially sectioned, of a butterfly type valve in accordance with the present invention.

In the description which follows like parts are marked throughout the specification and drawing with the same reference numerals, respectively. The drawing figures are not necessarily to scale and certain features of the invention may be shown exaggerated in scale in the interest of clarity and conciseness.

Figures 2, 4:
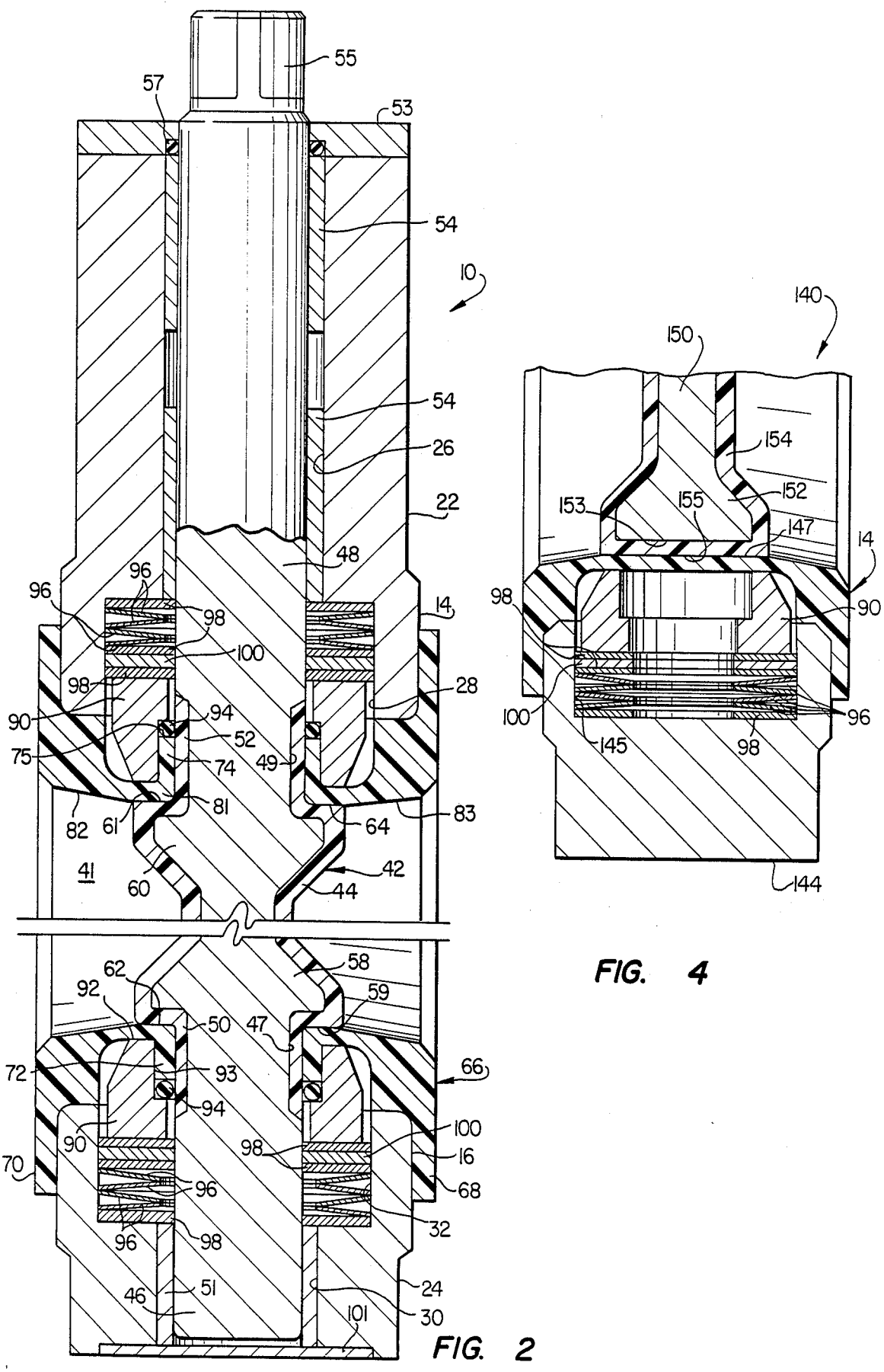
FIG. 2 is a vertical central section view through the valve illustrated in FIG. 1 on a larger scale showing details of the stem seal structure for the stem portions on opposite sides of the closure disc.
FIG. 4 is a detailed section view of a second alternate embodiment of a closure disc seal arrangement for the side of the closure disc opposite the actuator stem portion.

Referring primarily to FIGS. 1 and 2, there is illustrated a valve in accordance with the present invention and generally designated by the numeral 10. The valve 10 is of the so-called butterfly type and is characterized by a cylindrical body 12 made up of opposed semicylindrical body parts 14 and 16 which are joined together along diametrial faces 15 and 17 by opposed fasteners 18. The body parts 14 and 16 each include opposed bosses and 19 and 20 for receiving the fasteners 18. The body parts 14 and 16 also include opposed bosses 22 and 24, respectively. As shown in FIG. 2, the boss 22 includes a stepped bore 26–28 and the boss 24 includes a stepped bore 30–32. The housing parts 14 and 16 are also provided with opposed semicylindrical flanges 34, 36, 38 and 40, respectively, for securing the valve between flanges of a suitable conduit or the like, not shown.

The valve 10 is further characterized by a generally cylindrical butterfly type closure disc 42 interposed in a longitudinal flow passage 41 and having a generally cylindrical steel core portion 43 which is coated or overmolded with a continuous layer 44 of PFA fluoroplastic of the type manufactured under the trademark TEFLON. The closure disc 42 includes opposed coaxial stem portions 46 and 48 which extend into the bores 30, 32 and 26, 28, respectively. Each of the stem portions 46 and 48 is undercut at 47 and 49, FIG. 2, respectively, to form a cylindrical recess into which cylindrical collar portions 50 and 52 of the PFA plastic layer extend to form a cylindrical seal collar for the respective stem portions 46 and 48. The stem portion 48 extends through the bore 26 and is supported therein by spaced apart sleeve bearing members 54 which may be selected of a self lubricating and corrosion resistant material. The stem portion 48 includes a drive tang 55 which is adapted to be connected to a suitable drive mechanism for rotating the closure disc 42 about the longitudinal central axis of the stem portions 46 and 48. A cover 53 is suitably secured to the boss 22 and includes a recess for an o-ring seal 57 disposed around the stem portion 48 and sealingly engaged with the stem portion and with the bearing 54 to prevent leakage of pollutants into the valve 10 from the surrounding environment. The stem portion 46 is supported in a self lubricating sleeve bearing 51 similar to the bearings 54 and disposed in the bore 30.

Referring further to FIGS. 1 and 2, the stem portions 46 and 48 extend from generally cylindrical bosses 58 and 60 which are overmolded with the PFA plastic layer 44 to form opposed annular seal surfaces 59 and 61, respectively. The seal surfaces 59 and 61 are engagable with opposed cooperating seal surfaces 62 and 64, respectively, FIG. 2, which are formed on a generally cylindrical plastic valve body liner, generally designated by the numeral 66, which is disposed between the body parts 14 and 16 and held captive thereby by opposed circumferential flanges 68 and 70. The liner 66 is preferably molded in one piece of high density PTFE fluoroplastic and includes opposed cylindrical collar portions 72 and 74 disposed around the circumferential seal collar portions 50 and 52. As shown in FIG. 1, the liner 66 is also provided with opposed partially circumferential resilient backup bands 78 and 80 which are interposed between the body parts 14 and 16 and the liner 66. The bands 78 and 80 permit some deflection of the liner circumferential wall 81 upon engagement thereof by the periphery of the closure disc 42 to assist in forming a fluid tight seal between the closure disc and the seat surface formed by the wall 81 and to reduce unseating forces required to rotate the closure disc away from a closed and seated position in engagement with the wall 81. As shown in FIG. 2, the circumferential wall 81 is tapered radially outward at 82 and 83 with respect to the longitudinal central axis A, FIG. 1, of the valve body liner 66 toward the flanges 70 and 68, respectively. An annular seal area is provided between the closure disc 42 and the liner 66 at the cooperating seal faces 59 and 62 and 61 and 64, respectively, whereby a fluid tight seal is provided between the stem portions 46 and 48 of the closure disc and the interior bore defined by the circumferential liner wall 81. This particular seal arrangement minimizes any chance for collection of debris or material entrained in the fluid flowing through the valve since there is no pocket or dead circulation space in which material may lodge as it flows over and around the closure disc 42.

Referring further to FIG. 2, the valve 10 is provided with improved stem portion seal means for the respective stem portions 46 and 48, respectively. With regard to the stem portion 46 there is provided a generally cylindrical annular pusher plug 90 disposed at least partially in the bore 32 and having a transverse endface 92 engageable with the liner 66 opposite the seal face 62 for biasing the seal face 62 into engagement with the seal face 59. The pusher plug 90 includes a counterbore portion 93 defining a surface disposed snugly around the collar portion 72 and forming containment for an o-ring 94. The pusher plug 90 is biased toward the seal face 62 by an arrangement of back to back circular disc or Belleville type springs 96, which are interposed between opposed cylindrical seal washers 98. A seal ring 100 is disposed around the stem portion 46 between one of the seal washers 98 and a third seal washer 98 engageable with the pusher plug 90. Thanks to the arrangement of the seal washers 98 and the seal ring 100 multiple seals are interposed between the pusher plug 90 and the distal end of the stem portion 46 and the outermost seal washer 98 prevents exposure of the seal assembly for the stem portion 46 to external environmental contaminates. This arrangement is particularly advantageous wherein the bore 30 may be open to atmosphere. The bore 30 may be closed by a closure plug 101 to further reduce the chance of exposure of the seal assembly in the bore 32 to the external environment.

In accordance with an important aspect of the present invention the provision of the circular disc type Belleville springs within the bore 32 provides a relatively high spring rate for urging the pusher plug 90 against the liner 66 to assure that a substantial fluid tight seal is formed between the annular cylindrical seal faces 59 and 62 while at the same time, upon disassembly and servicing of the valve 10, the springs 96 relax with very litle linear travel as the stem portion 46 and the associated pusher plug 90 and seal elements 98 and 100 are withdrawn from the bore 32 to thereby facilitate assembly and disassembly of the valve 10.

The stem portion 48 is also provided with a seal construction virtually identical to the seal formed around the stem portion 46. A second pusher plug 90 is disposed around the collar 74 and an o-ring 94 is interposed between the pusher plug 90 a transverse endface 75 of the collar 74 and the seal surface 52 formed on the stem portion 48. A second back to back configuration of four circular disc or Belleville type springs 96 is interposed in the bore portion 28 between seal washers 98 and a seal ring 100 is interposed between one of the seal washers 98 and a third seal washer 98 contiguous with the pusher plug 90. Again, due to the relatively high spring force obtainable for small deflections by the arrangement of the Belleville springs 96 a substantial biasing force may be exerted across the seal faces 61 and 64 to form a fluid tight seal therebetween while at the same time facilitating assembly and disassembly of the valve seal components. The seal washers 98 and the seal rings 100 are preferably dimensioned to be a very close, essentially line to line, fit around the stem portions 46 and 48. Thanks to the arrangement of the seal washers 98 and the seal ring 100, the seal biasing springs 96 are protected from exposure to corrosive fluids from both inside the valve 10 as well as external environmental effects.

In accordance with another important aspect of the present invention it has been determined that by providing the layer 44 of overmolded or coated plastic of perfluoroalkoxy (PFA) plastic and by providing the liner 66 of a high density polytetrafluoroethylene (PTFE) plastic there is little tendency for the closure disc to adhere to the liner in the closed and seated position. It has been determined that over long periods of time that with identical plastics of the PFA type provided as both the coating over the closure disc and as the liner material that fusion between the two parts tends to occur. However, with the use of PTFE and PFA plastics on the respective parts a suitably low coefficient of friction is maintained to reduce closure disc opening torque, a suitable seal is maintained between the closure disc and the liner and the aforementioned fusion tendency is eliminated. It has also been determined that the layer 118 may be desirably formed of molded polyvinylidene fluoride plastic (PVDF) which also reduces the chance of cold fusion to the liner and provides a suitable coefficient of friction.

Figure 3:
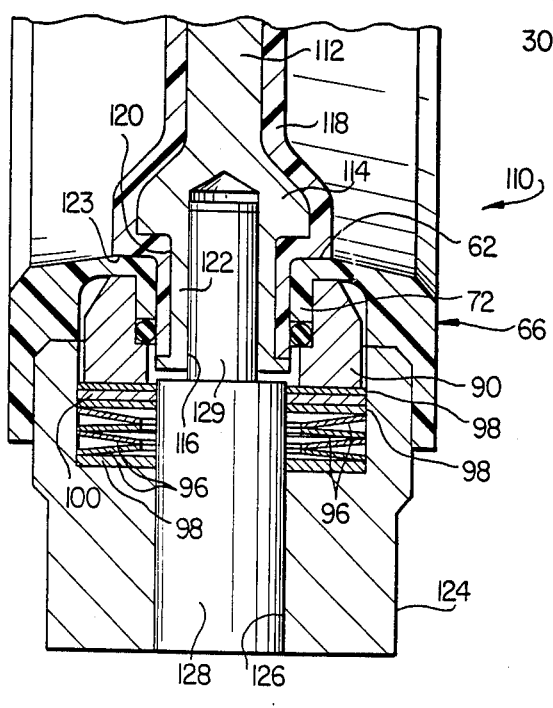
FIG. 3 is a detailed section view of a modification of the seal arrangement for a modified closure disc pivot pin or stem portion opposite the actuator stem portion.

Referring now to FIG. 3, there is illustrated a first alternate embodiment of a butterfly valve in accordance with the present invention, generally designated by the numeral 110. The valve 110 is identical in all respects to the valve 10 except for a modification of the lower stem portion of the closure disc and the body portion 16. In the valve 110 a closure disc 112 is provided which has a modified lower stem boss 114 having a transverse diametral blind bore 116 formed therein. The closure disc 112 is overmolded with a layer 118 of PFA or PVDF type plastic which extends into an undercut groove 120 formed on a shortened lower stem portion 122. The coating 118 also provides an annular transverse seal surface 123 engageable with the seal surface 62 on the liner 66. The valve 110 includes a lower body part 124 similar to the body part 16 except for the provision of a bore 126 in which a trunnion 128 is suitably disposed such as by a modified force fit. The trunnion 128 has a reduced diameter portion 129 projecting into the bore 116 in supportive relationship to the lower stem portion 122 of the closure disc 112.

The valve 110 is also provided with the improved seal configuration of the present invention including a pusher plug 90 interposed between the seal surface 62 of the liner 66 and an arrangement of seal washers 98, a seal ring 100 and a series of 4 back to back circular disc or Belleville springs 96. In the arrangement of the valve 110 the closure disc 112 may be easily removed from the bore formed by the collar 72 of the liner 66 without requiring reinsertion of the stem portion 122 into and through the seal rings and the circular disc springs. Moreover, the valve 110 may be used in applications wherein zero leakage from the stem portion seals must be provided even in the unlikely event of the failure of the primary and secondary seal configuration.

Referring now to FIG. 4, a second alternate embodiment of a butterfly type valve is illustrated in partial section and generally designated by the numeral 140. The valve 140 is also identical to the valve 10 except for the provision of a modified body liner 142 similar to the liner 66 except for the elimination of the seal collar 72. The valve 140 also utilizes a modified body part 144 in place of the body part 16 and which is identical to the body part 16 but has a blind bore 145 formed therein for receiving the assembly of seal washers 98 and circular disc springs 96. A pusher plug 90 is also disposed in the bore 145 and extends into engagement with the liner 142 adjacent to a seal surface 147.

A modified closure disc 150 is provided for the valve 140 and is similar to the closure disc 42 except for the provision of a boss 152 in place of the boss 58 and which does not have an integral stem portion extending diametrally. The closure of the disc boss 152 has a transverse face 153 which is overmolded with a layer 154 of PFA plastic to form a seal surface 155 engagable with the seal surface 147.

The valve 140 is generally typical of a design utilized for smaller diameter conduits wherein a single stem portion similar to the stem portion 48 may be used to support the closure disc 150 in the valve body. In the valve 140 a body part 14 may be used in conjunction with a body part 144 and the closure disc 15 may have a stem portion, not shown, virtually identical to the stem portion 48 of the closure disc 42. With the valve 140 there is also the reduced risk of leakage of fluid past the seal formed by the seal surfaces 147 and 155 and out of the body parts since only one stem portion exists to represent potential exposure to leakage out of the valve itself. Moreover, the cavity formed by the bore 145 is sealed from exposure to fluids flowing through the valve and, in fact, the seal rings 98 and 100 may be eliminated and replaced by spacers or by shortening the depth of the bore 145 so that the springs 96 bear directly against the pusher plug 90 to maintain a seal across the surfaces 147 and 155.

Although several embodiments of an improved butterfly type valve have been described herein, those skilled in the art will recognize that certain features of the invention may be utilized in valves of similar construction such as certain types of ball or plug valves having opposed stem portions and requiring seals at the juncture of the stem portions with the valve body. Those skilled in the art will also recognize that other substitutions and modifications may be made to the specific embodiments illustrated and described herein without departing from the scope and spirit of the invention as recited in the appended claims.

What is claimed is:

1. A butterfly type valve comprising:
    a body defining a flow passage and having at least one transverse bore formed therein;
    a closure disc disposed in said flow passage with a stem on said disc being received in said transverse body bore;
    a resilient body liner having an integral collar portion extending to an end and including a central bore disposed in said transverse body bore for receiving said stem;
    said closure disc being rotatably supported in said body by said stem for movement between open and closed positions with respect to said body flow passage;
    a layer of resilient material covering said closure disc and at least a portion of said stem, said layer of resilient material covering said portion of said stem forming a cylindrical collar interfitting with said collar portion of said liner and defining a first annular seal surface extending about said stem portion;
    said resilient body liner defining a second annular seal surface extending about said stem portion and engageable with said first annular seal surface for cooperatively effecting a sealed relation about said stem relative to said flow passage;

an annular substantially inelastic plug independent of said body liner and said disc layer loosely disposed in said body bore about said collar portion, said annular plug including a surface extending closely about said liner collar portion and a central bore with a radial shoulder formed at an intermediate location therein and an annular seal disposed between said shoulder and the end of said liner collar portion; and at least one circular disc spring disposed compressed in said body bore for biasing said plug into engagement with said body liner to impose substantially all of the available compressive force thereof against said first annular seal surface for urging said seal surfaces into engagement with each other to form a seal between said surfaces.

2. The valve set forth in claim 1 including:

a first seal ring disposed around said stem in said transverse body bore for shielding said spring from fluids external of said body part.

3. A valve comprising:

a body having a longitudinal fluid flow passage means formed therein;

opposed transverse bores in said body aligned with each other;

a closure member disposed in said flow passage means and rotatable therein between valve open and closed positions, said closure member including opposed support stem means extending into respective ones of said bores and supporting said closure member for rotation;

opposed annular seal surface means formed on said closure member about said stem means and having exposed seal surfaces;

seal means forming opposed seal surfaces on said body and cooperable with the seal surfaces on said seal surface means to substantially prevent fluid leakage from said passage means into said bores, respectively, said seal means comprising a resilient plastic liner disposed in said passage means and including opposed annular seal surfaces formed thereon and opposed coaxial collar portions extending to an end and disposed around said stem means;

said seal surfaces of said seal surface means being comprised of a layer of resilient plastic material disposed over a core part of said closure member and further including cylindrical surfaces extending about said stem means so as to interfit and be journalled by said collar portions, respectively;

opposed annular substantially inelastic pusher plug members independent of said seal surface means and said seal means loosely disposed about said stem means surrounding said collar portions; said plug members being coaxially displaceable toward urging engagement between said cooperable seal surfaces of said seal means and said seal surface means, each of said pusher plug members including a surface extending closely about said seal means collar portion and a central bore with a radial shoulder formed at an intermediate location therein and said valve includes an annular seal disposed in said central bore between said shoulder and the end of said seal means collar portion to provide a secondary seal thereat surrounding said stem; and conical disc spring means disposed compressed in the respective of said body bores for imposing substantially all of the available compressive force thereof against said pusher plug members enabling the pusher plug members to urge said seal means forming said seal surfaces on said body into forcible engagement with said seal surfaces on said closure member.

4. The valve set forth in claim 3 including:

seal washers disposed in said transverse bores between said spring means and the exterior of said body.

* * * * *